United States Patent
Gurusami et al.

(10) Patent No.: US 9,752,955 B2
(45) Date of Patent: Sep. 5, 2017

(54) EDGE PROPAGATING OPTICAL TIME DOMAIN REFLECTOMETER AND METHOD OF USING THE SAME

(71) Applicant: II-VI Incorporated, Saxonburg, PA (US)

(72) Inventors: Aravanan Gurusami, Morgan Hill, CA (US); Timothy Zahnley, Savona, NY (US); Scott Dahl, Lindley, NY (US); Deepak Devicharan, Horseheads, NY (US); Ian Peter McClean, Brixham (GB)

(73) Assignee: II-VI INCORPORATED, Saxonburg, PA (US)

( * ) Notice: Subject to any disclaimer, the term of this patent is extended or adjusted under 35 U.S.C. 154(b) by 135 days.

(21) Appl. No.: 14/755,057

(22) Filed: Jun. 30, 2015

(65) Prior Publication Data

US 2016/0033359 A1   Feb. 4, 2016

Related U.S. Application Data

(60) Provisional application No. 62/031,288, filed on Jul. 31, 2014.

(51) Int. Cl.
| | |
|---|---|
| *G01N 21/00* | (2006.01) |
| *G01B 9/02* | (2006.01) |
| *G01J 3/28* | (2006.01) |
| *G02B 6/26* | (2006.01) |
| *H04B 10/08* | (2006.01) |
| *G01M 11/00* | (2006.01) |

(52) U.S. Cl.
CPC .... *G01M 11/3109* (2013.01); *G01M 11/3145* (2013.01)

(58) Field of Classification Search
CPC ............ H04B 10/071; G01M 11/3109; G01M 11/3118; G01M 11/3145; G01M 11/3163; G01M 11/319
USPC ................. 356/73.1, 477, 484, 326; 385/15; 398/10, 13, 16, 17, 20, 21, 25, 58, 63, 9; 702/190
See application file for complete search history.

(56) References Cited

U.S. PATENT DOCUMENTS

| | | | |
|---|---|---|---|
| 5,298,965 A | | 3/1994 | Spirit et al. |
| 5,442,434 A | * | 8/1995 | Liao .................... G01M 11/3145 356/73.1 |

(Continued)

FOREIGN PATENT DOCUMENTS

| | | |
|---|---|---|
| EP | 0468412 A2 | 1/1992 |
| WO | WO 8805531 | 7/1998 |

*Primary Examiner* — Sunghee Y Gray
(74) *Attorney, Agent, or Firm* — Wendy W. Koba

(57) ABSTRACT

An OTDR system utilizes a laser source that is turned "on" and kept powered until its light reaches the end of the fiber span being measured (i.e., until the fiber span is fully illuminated). At any point in time after the fiber is fully illuminated, the laser source can be turned "off". The return (reflected and backscattered) signal is directed into a photodetector of the OTDR, and is measured from the point in time when the fiber span starts to be illuminated. The measurements are made by sampling the return signal at predetermined time intervals—defined as the sampling rate. The created power samples are then subjected to post-processing in the form of a differentiation operation to create a conventional OTDR trace from the collected data.

9 Claims, 13 Drawing Sheets

(56) References Cited

U.S. PATENT DOCUMENTS

| | | |
|---|---|---|
| 5,963,313 A | 10/1999 | Anderson |
| 6,674,518 B1 | 1/2004 | Asher et al. |
| 6,819,473 B2 | 11/2004 | Aoki et al. |
| 8,406,620 B2 | 3/2013 | Khermosh et al. |
| 2008/0013079 A1 | 1/2008 | Bottman et al. |
| 2009/0079967 A1* | 3/2009 | Radic .................. G01M 11/319 356/73.1 |
| 2010/0073667 A1* | 3/2010 | Cyr .................... G01M 11/3163 356/73.1 |
| 2015/0016816 A1 | 1/2015 | Piehler |

* cited by examiner (a)

(b)

EDGE PROPAGATING OPTICAL TIME DOMAIN REFLECTOMETER AND METHOD OF USING THE SAME

CROSS-REFERENCE TO RELATED APPLICATIONS

This application claims the benefit of U.S. Provisional Application Ser. No. 62/031,288, filed Jul. 31, 2014 and herein incorporated by reference.

TECHNICAL FIELD

The present invention relates to an optical time domain reflectometer (OTDR) and, more particularly, to an OTDR that utilizes edge propagation of low power laser signal as the probe source ("edge" referring to an optical signal transition from either light to dark, or dark to light).

BACKGROUND OF THE INVENTION

Testing and characterization of optical fiber during the course of its installation is an important step in the process of deploying an optical communication system. Measurements such as fiber length, loss and chromatic dispersion have generally been performed manually by the personnel installing new fiber, recording this information to create a "start of life" characteristic profile for a given span of fiber. In some cases, this characteristic profile is used to select the proper operating values for parameters of optical devices deployed along the fiber span. Given the ever-increasing desire for more centralized control of optical communication systems (through network management techniques such as Software Defined Network (SDN) concepts), the ability to automate the characteristic profile measurement process is becoming important. Indeed, the desire is to be able to continuously update the profile information on every fiber span in a system so that intelligent routing decisions can be made, providing dynamic control within the network. With both cost and size constraints being a concern, the ability to embed this type of meteorological analysis into existing functions is essential.

There is also an increase in the deployment of distributed Raman amplification within optical communication networks to allow for higher data rate transmission to remain error-free. Inasmuch as parameters associated with the Raman sources are a function of the fiber's characteristics, the ability to measure loss characteristics of a given fiber span, as well as components disposed along a fiber span, is becoming critical to obtaining optimum Raman amplifier performance. Identification of loss and reflection events, such as high loss bends, poor connector quality, or splices can point out possible failure modes before there is an interruption in service. "Live" (i.e., real-time) loss measurements can enable identification of failing networks before catastrophic damage occurs, Additionally, when fault locations can be quickly and accurately identified, the downtime for the affected fiber span is minimized. Optical budgets can be determined (and controlled) by providing information on the best and most efficient routes to direct data channels.

For many years, conventional OTDR instruments have been used to characterize optical fiber spans. The basic OTDR technique transmits high-power, short laser pulses (also referred to as "probe pulses") along the fiber span being measured. Any light that is then backscattered (Rayleigh scattered) or reflected (Fresnel reflection) in the reverse direction along the fiber is captured by a photodetector component of the OTDR, with a temporal and amplitude analysis of the return signal providing a characterization profile of the fiber span. Narrow pulse width provides high spatial resolution for loss and reflection events. However, as the returned signal is proportional to the energy contained in the pulse, the use of narrow pulse widths also results in reduced strength of the received signal. For example, a pulse width of 10 ns provides a spatial resolution of one meter, and returns only 0.0000001 of the transmitted power as Rayleigh backscatter. This low power is further reduced by the two-way loss introduced by the fiber. Thus, fiber span measurement distance accuracy is primarily defined by the width of the probe pulse, where shorter pulse widths provide less data in the return signal but provide more accurate span length results.

Additionally, since the OTDR system itself has a limited bandwidth, the fall time of the probe pulse is not infinitely fast. Therefore, if there are two reflective events spaced very close together along a fiber span, it is possible that the second event may be "missed" by the system if the signal associated with the first event has not dropped appreciably by the time the second event occurs. That is to say, when two reflections are spaced closer together than this limit, they essentially become indistinguishable. This is defined as the event dead zone. Another related parameter is defined as the attenuation dead zone, where a return signal from one event temporarily saturates the optical detector, creating a period of time where the detector cannot accurately perceive a second event. The problems with these "dead zones" in OTDR systems have been known about for years, with various types of work-arounds proposed.

One prior art technique for addressing these limitations of conventional OTDR systems relates to the utilization of a specific coding scheme in the probe pulse train. The use of a coded pulse stream allows for the pulse width of each individual pulse to remain relatively short, yet longer spans of fiber are able to be accurately characterized. However, these benefits come at the price of requiring highly complex software to generate and then process the coded OTDR waveforms, with impacts on the measurement time (as well as requiring dedicated laser sources to provide accurate input probe pulse data codes).

SUMMARY OF THE INVENTION

The needs remaining in the prior art are addressed by the present invention, which relates to an optical time domain reflectometer (OTDR) and, more particularly, to an OTDR that utilizes edge propagation of low power laser signal as the probe source ("edge" referring to an optical signal transition from either light to dark, or dark to light).

In accordance with one embodiment of the present invention, the laser source of the novel OTDR system is turned "on" and kept powered until the light reaches the end of the fiber span being measured (i.e., until the fiber span is fully illuminated). At any point in time after the fiber is fully illuminated, the laser source can be turned "off". The return (reflected and backscattered) signal is directed into a photodetector of the OTDR, and is measured from the point in time when the fiber span starts to be illuminated. The measurements are made by sampling the return signal at predetermined time intervals—defined as the sampling rate. The input signal can be at a relatively low power, since there is no concern about a "pulse" attenuating to zero at a remote point along the fiber (one aspect of the "dynamic range" problem of conventional OTDRs). As a result of using a low power probing signal, a simple photodetector with average sensitivity properties is sufficient to recover and process the return signal. The created power samples are then subjected to post-processing in the form of a differentiation to create a conventional OTDR trace from the collected data.

This embodiment may be defined as a "leading edge" configuration, where a dark fiber is continuously filled with light until fully illuminated. The return signal is thus indicative of an increase in reflected and scattered optical power. In an alternative embodiment, a "trailing edge" configuration may be used, where a fully-illuminated fiber progressively becomes darker. The return signal in this trailing edge embodiment is similarly measured by the OTDR's photo detector, where a continual decrease in return optical signal power is exhibited over time. Yet another embodiment may utilize both "leading edge" and "trailing edge" measurements. In this case, an averaging of the results from leading edge and trailing edge measurements will reduce the influence of noise on the measurements and improve the ability to accurately measure long fiber spans (e.g., spans in excess of 100 km).

In any embodiment, the return signal is sampled as a function of time and the power level associated with each sample recorded. At every instance of sampling at the receiver, the sum (integral) of all of the reflections and backscattered light from the input port of the fiber span to the current point to which the light (or dark) has propagated (i.e., leading edge or trailing edge, as the case may be). By subtracting (differentiating) the value of returned power measured at two separate instances in time, the insertion loss difference between the two corresponding positions of the propagating light along the fiber is obtained. These difference calculations of reflected power measured at defined time periods results in generating a loss profile of the fiber span (the "loss profile" being the well-known OTDR trace). The illumination using a continuous probe signal can be thought of as "integrating" the conventional pulse-based OTDR scheme, and the use of difference calculations on the return signal can be equated to differentiating the return signal cover to recover the typical OTDR trace.

The use of a low power signal has also been found to minimize the dead zone problems of prior art OTDR systems. For example, replacing the prior art pulse probe signal with the edge-propagating signal of the present invention has been found to reduce an exemplary attenuation dead zone from 5.3 m to about 0.8 m.

It is an advantage of the present invention that only a single dataset of sampled return power measurements needs to be collected to completely characterize a fiber span. This is in contrast to the prior art pulsed OTDR systems, where a large number of pulses are required (thousands of pulses) to perform the same characterization, with multiple measurements made of these pulses. Thus, inasmuch as a complete return signal power dataset is initially created, the resolution of the post-processing (difference-generating) is simply adjusted by selecting the number of samples over which the average is determined. The fewer the number of samples in each difference calculation, the greater the resolution (but the higher the level of noise present in the OTDR trace). Using a larger time base (larger number of samples) in the difference calculation creates a smoother trace by minimizing the noise that is evident, where the reduction in noise allows for events occurring "deep" within the fiber span to be more easily visible.

The accuracy of the results is therefore a function of the sampling rate used to collect the initial dataset of measured return power. Afterward, during the post-processing calculations of the OTDR trace, the resolution in the generated trace is a function of the "window size" over which the difference is calculated. Indeed, the results are distance-invariant with respect to accuracy; that is, the same level of accuracy is achieved for measurements associated with any point along the fiber span. It is also possible to configure the system to oversample the return power signal (that is, collect the data with a resolution that is higher than necessary) so that a moving average can be calculated along the distance axis and minimize the effects of noise on the results. Using a multiple number of edge propagations along the same span can also be used to reduce the presence of noise in the OTDR results, where if a set of N separate edge propagation sweeps are performed, a set of N data points for each position along the fiber span can be averaged to minimize the impact of noise, photodetector imperfections, etc.

Advantageously, since there is no need to generate optical pulses, any available optical source may be used to create the CW signal for the inventive OTDR system. This technique provides the ability to embed an OTDR function into very compact and simple designs and thus be situated within many disparate points within a given network. Moreover, in configurations that utilize an Optical Service Channel (OSC), the laser source utilized for this monitoring functionality may also be used, from time to time, to perform the infinite backscatter OTDR measurement of the present invention. Indeed, an advantage of using the low power edge-propagation technique is that it may be employed at the same time that data is being transmitted over the fiber span. Thus, in contrast to many types of prior art OTDR measurement systems, a fiber span does not have to be taken out of service during the measurement process.

An exemplary embodiment of the present invention can be described as an OTDR measurement system comprising a laser source for injecting light into a first, input endface of an optical fiber span being measured and a control element for turning "on" and "off" the laser source, creating a leading edge of a propagating probe signal upon turning "on" the laser source and creating a trailing edge of the probe signal upon turning "off" the laser source. The measurement system also includes a photoreceiver coupled to the first, input endface of the optical fiber span for receiving a returned portion of the propagating probe signal and providing a measurement of the returned optical power as an electrical output power signal and a data analysis unit for sampling the electrical output of the photoreceiver, storing a plurality of sampled measurements and processing the plurality of sampled measurements to generate an OTDR trace as the output of the OTDR measurement system.

In another embodiment, the present invention can be defined as a method of performing OTDR measurements along a fiber span including the steps of: a) initializing a fiber span; b) injecting an optical signal into an input port of an optical fiber span, and recognizing an edge of the optical signal as an initial measurement point; c) measuring return, reflected optical power at the input port, wherein the measuring is performed at a predetermined sampling rate for an extended period of time, creating a plurality of measured power samples; d) storing the plurality of measured power samples in a database; e) determining an appropriate resolution factor for creating an OTDR trace exhibiting a desired level of detail; f) performing a difference calculation on the plurality of measured power samples, using the appropriate resolution factor as the space between the difference calculation endpoints and g) plotting the results of the difference calculation performed in step f) to create the OTDR trace.

Other and further aspects and concepts of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Prior to describing the details of the present invention, a brief description of a conventional, pulsed OTDR system will be provided. With an understanding of the conventional pulsed OTDR system, the details and advantages of the edge-propagating OTDR system of the present invention will be clearly evident.

Figure 1:
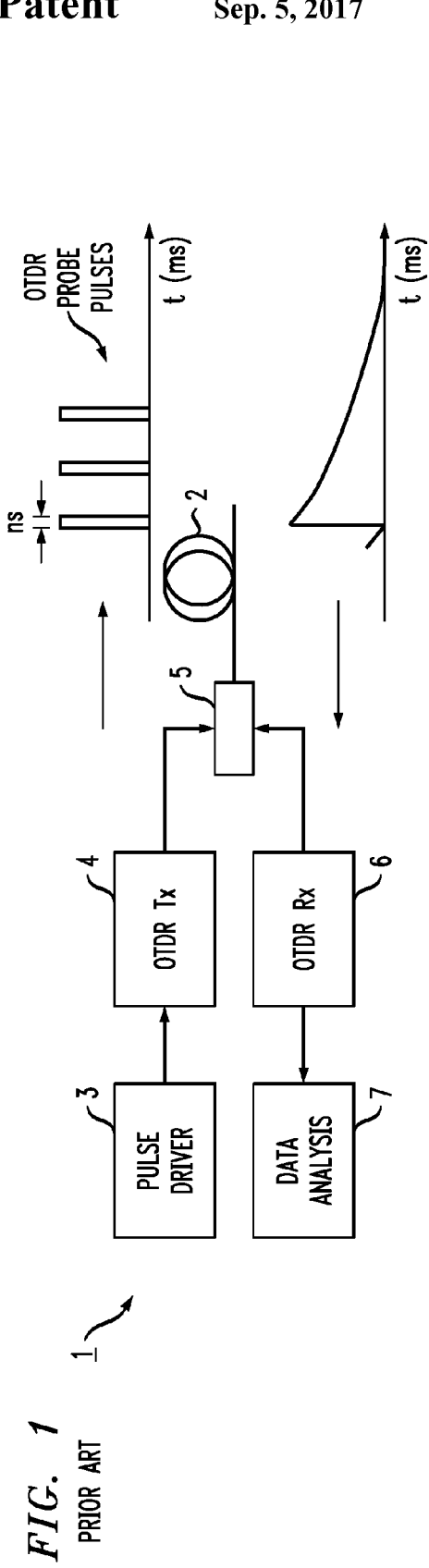
FIG. 1 illustrates an exemplary prior art OTDR system being used to characterize an optical fiber span.

FIG. 1 illustrates an exemplary prior art OTDR system 1 being used to characterize an optical fiber span 2. A pulse driver 3 is used to create high-power, relatively short pulses from an OTDR transmitter laser source 4. A graph of the created OTDR probe pulses is also shown in FIG. 1. The created pulses are injected into fiber span 2 via an optical coupler 5. Return light from these probe pulses (comprising both Rayleigh backscattering associated with the fiber composition and Fresnel reflections from abrupt loss events, such as splices) is subsequently directed by coupler 5 into an OTDR receiver component 6. A graph of an exemplary return signal is also shown in FIG. 1.

Receiver component 6 includes a photodetecting device (photo diode) for converting the optical return signal into an equivalent electrical form. A data analysis unit 7 performs spectral and amplitude processing of the electrical signal (similar to a radar system processing echo information for radio systems), creating an OTDR trace as shown in simplified form in FIG. 2.

Figure 2:
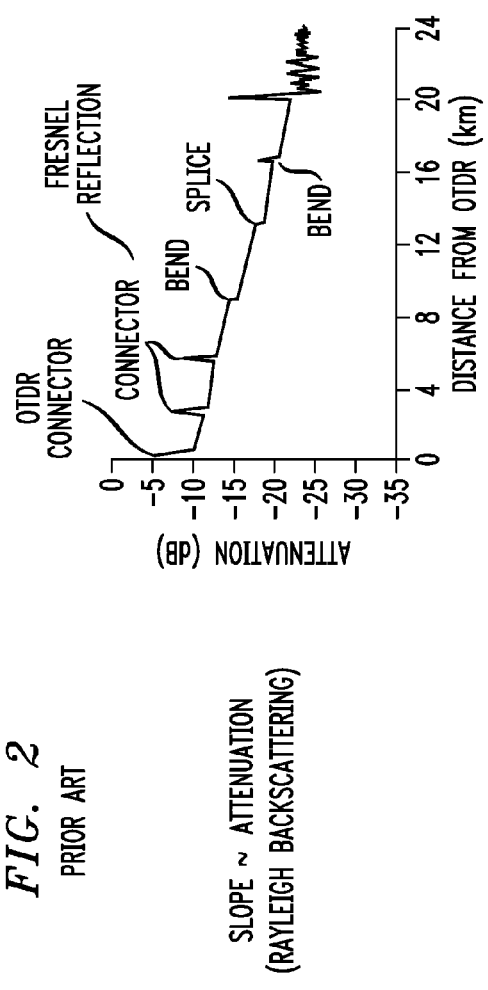
FIG. 2 depicts a typical OTDR trace, showing the results in the form of attenuation (in dB) as a function of distance (km) along the fiber span.

FIG. 2 depicts a typical OTDR trace, showing the results in the form of attenuation (in dB) as a function of distance (km) along the fiber span. The general slope of the trace is a representation of the Rayleigh scattering along the fiber span, which is known to be a function of the composition of the fiber itself and is generally a linear response. The various spikes along the trace can be associated with specific Fresnel losses, such as coupling losses, fiber damage, splices, etc., as they appear along the length of the fiber. Beyond a predetermined distance D, the OTDR trace becomes overwhelmed by the presence of noise in the OTDR receiver, this distance D thus defining the length of a typical span that is capable of being evaluated with a particular OTDR system (including factors such as pulse width, pulse amplitude, receiver sensitivity, processing capabilities, and the like), also referred to as the "dynamic range".

The present invention addresses this distance limitation constraint of prior art OTDR systems by utilizing an edge-propagating OTDR probe signal input and performing additional processing of the return signal, providing a simple and straightforward method and system for performing on-going OTDR analysis of fiber spans, including the ability to utilize an "embedded" OTDR system that may perform continuously-updated measurements of a fiber span for the lifetime of the span.

Figure 3:
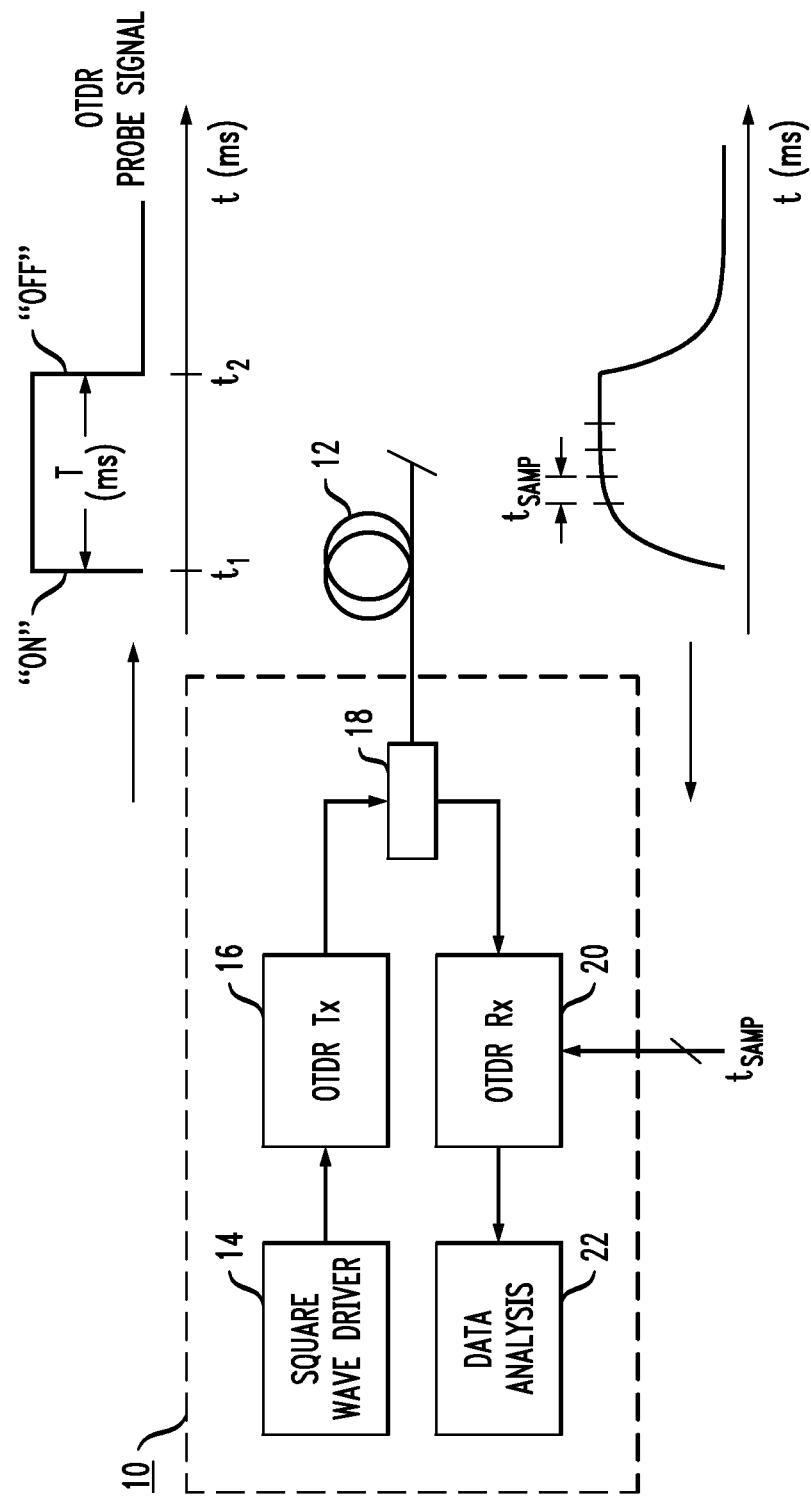
FIG. 3 is a simplified diagram of an exemplary OTDR system formed in accordance with the present invention.
Figure 4:
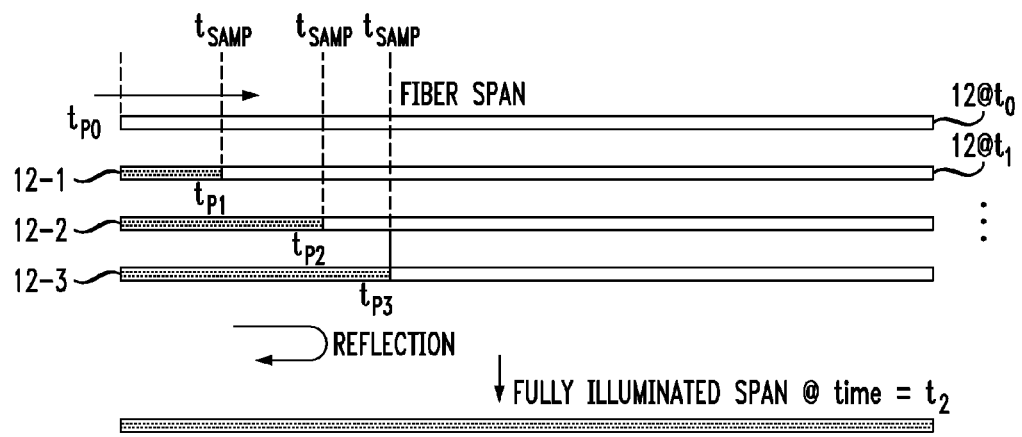
FIG. 4 is a set of diagrams that illustrate the continuous "filling" of a fiber-under-test with illumination from the CW source of the system of FIG. 3.

FIG. 3 is a simplified diagram of an exemplary OTDR system 10 formed in accordance with the present invention. FIG. 4 is a set of diagrams that illustrate the continuous "filling" of a fiber-under-test with illumination from the light source of OTDR system 10. For the purposes of explanation, it is useful to refer to both FIGS. 3 and 4 during the following discussion.

As shown in FIG. 3, edge-propagating OTDR system 10 is used to provide characterization of an associated optical fiber span 12. In this particular embodiment of the present invention, system 10 utilizes a driver circuit 14 to generate a waveform that is impressed upon an optical output signal from a laser source 16. An exemplary signal trace is depicted in FIG. 3 and shows the output waveform from laser source 16 including a turn-on at time $t_1$, forming the continuous probe input signal. In accordance with the present invention, laser source 16 remains "on" for an extended period of time T (on the order of at least hundreds of µs or ms) sufficient to completely "fill" a fiber that is initially dark. As shown, the "leading edge" of the optical signal will propagate along fiber span 12. For example, a 20 km fiber will require a probe signal of approximately 100 µs duration to fully illuminate the complete 20 km fiber span. Thereafter, laser source 16 is turned "off" at time $t_2$, and the trailing edge of the probe signal will then propagate along fiber span 12.

In comparison to prior art pulsed OTDR systems, the edge-propagating OTDR system of the present invention is able to function extremely well with relatively low power input signals. In the prior art, the pulse needed to have enough energy to propagate a relatively long distance along the fiber span and create a return signal within sufficient energy to be measured. The cumulative process of the present invention, using the edge propagation, is not so dependent. For example, it is contemplated that a laser source 16 producing a probe signal in the range of about −20 dBm to 20 dBm is able to used to characterize the fiber, with a power range within the narrower limit of about −3 dBm to 10 Bm being preferred in most cases.

Instead of using a separate driver circuit to provide this waveform, it is to be understood that a switch arrangement or any other suitable circuit configuration may be used to control the turning on/off of laser source 16 so that a continuous source of light is available that is able to completely illuminate a fiber span for the purpose of OTDR measurements. Indeed, it is an advantage of the arrangement of the present invention that a laser source already disposed in place along the fiber span (such as a pump source) may be used, from time to time, as the source for this OTDR process, since there is no need to generate pulses to generate the OTDR trace.

The laser signal exiting source 16 is thereafter passed through an optical coupler 18 (and/or an optical isolator) and injected into fiber span 12. Referring to FIG. 4, a sequence of illustrations of fiber span 12 is shown, beginning with an initial point in time when the fiber is "dark" (that is, no light has been injected into the fiber). Then, at time laser source 16 is turned "on", and fiber 12 begins to be illuminated. After a first period of time, shown as $t_{P1}$ in FIG. 4, a first section 12-1 of fiber span 12 has been illuminated. After a second period of time, as the laser source remains "on", the illumination continues to fill fiber span 12, now extending to fill sections 12-1 and 12-2 (shown as point $t_{P2}$ in FIG. 4). The illumination continues until at least a point in time (defined as time $t_2$) when the entire span is illuminated.

Referring back to FIG. 3, the return light from fiber span 12 (backscattered and reflected light) will pass through optical coupler 18 and thereafter be directed into an optical receiver 20, which includes a photodetecting device (not shown) for converting the received optical signal into an electrical form. A simplified version of the return signal as captured by optical receiver 20 is also illustrated in FIG. 3. In accordance with the present invention, the received signal is sampled at predetermined time intervals, represented by the $t_{SAMP}$ gating input to optical receiver 20, where the intervals $t_{SAMP}$ are also depicted on the plot of return signal R of FIG. 3. The sampled measurement values are then applied as an input to a data analysis unit 22 for storage and further processing.

At every instance of sampling at optical receiver 20, the measured signal represents the sum (or integral) of all of the (infinite) backscattered and reflected light existing within the fiber. Therefore, as mentioned above and discussed in detail below, by subtracting (differentiating) the value of returned power at two instances in time, the insertion loss difference between the two corresponding positions of the propagating light in the fiber is obtained. This insertion loss difference corresponds to the conventional OTDR trace. Said another way, the edge-propagating (square wave) OTDR input probe signal can be thought of as the integrated version of the conventional probe pulse used in OTDR systems (the integration of a pulse function results in a square wave function). Thus, in order to recover the desired OTDR data obtained from this "integrated" input signal, it is proposed in accordance with the present invention to differentiate the collected data, creating the conventional OTDR trace. Data analysis unit 22 is shown as including a database 24 for storing the collected samples as the initial dataset, and a difference calculator 26 for creating the OTDR data output. The OTDR data output generally takes the form of an OTDR trace (such as shown above), which plots the return signal (on a dB scale) as a function of distance along the fiber span. Alternatively, the OTDR data can be displayed in tabular form (referred to as an "event table").

As will be discussed below, it is an advantage of the system and method of the present invention that all of the data required for creating OTDR traces of various resolution is obtained in a single measurement process (in contrast to the prior art's need to perform multiple measurement sequences to collect data). Once this initial dataset is collected and stored in database 24, a variety of different OTDR traces can be generated by difference calculator 26, each a function of the step size selected by the personnel analyzing the OTDR trace. Referred to at times hereinafter as the "resolution factor", the step size used to perform the difference calculation will control the amount of detail presented in the OTDR trace. For example, a low resolution factor (e.g., resolution factor=4), means that a step size of 4 samples (i.e., a differentiation window of four time intervals) is used to calculate each point on the OTDR trace. A resolution factor on the order of 32 is considered to be a "high" resolution factor, with a length of 32 time intervals included in each difference calculation. In accordance with the present invention, the resolution factor is a variable, applied as an input to difference calculator 26.

Thus, the step size (resolution) used to perform the differentiation (difference) calculation of the collected data is adjusted to assist in the analysis of different levels of detail in the OTDR trace. The fewer the number of samples included in the calculation, the finer the granularity of the OTDR trace (at the expense of exhibiting a higher noise level). The inclusion of a larger number of samples in the step size will smooth out the OTDR trace, reducing the noise level and enabling the identification of events further out along the fiber span.

Figure 5:
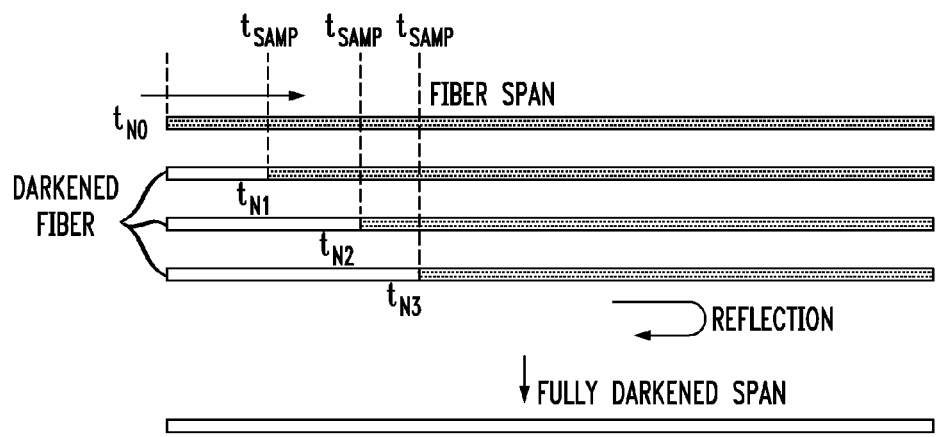
FIG. 5 is a set of diagrams associated with an alternative embodiment of the present invention, in this case illustrating the continuous "emptying" of a fiber-under-test.

It is to be understood that the edge-propagating OTDR system of the present invention as described thus far may just as easily be configured to use a "trailing" edge of a square wave as the waveform for input laser source 16. FIG. 5 contains a sequence of illustrations of fiber span associated with utilizing a "trailing" edge measurement configuration. As shown, one would begin the OTDR measurement in this instance with an optical fiber span that is fully illuminated. Then, as the "trailing" edge propagates along the fiber span, the fiber will empty and go dark. The remaining illustrations in the sequence of FIG. 5 depict this process, where again a return signal is measured at predetermined periods of time ($t_{SAMP}$) defined by the system's sampling rate. These power measurements are then stored in database 24 of data analysis unit 22 for further processing. In any configuration using a square wave signal to control the creation of edges, an exemplary square wave exhibiting a pulse width on the order of, for example, 1 ns to 100 ms may be used (with a preferred range being on the order of, perhaps, 10 ns to 20 ms).

Figure 6:
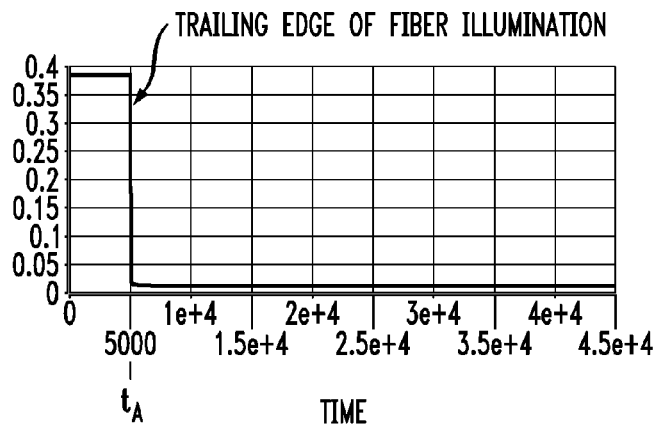
FIG. 6 is a signal trace showing an exemplary input probing signal that utilizes the "trailing edge" (negative-going edge) signal of FIG. 5.
Figure 7:
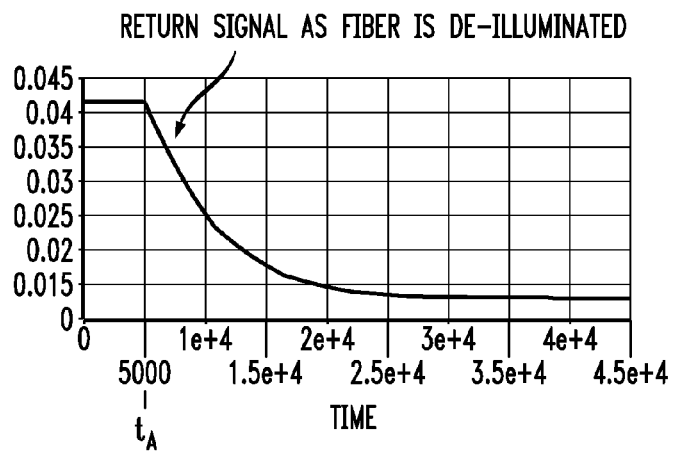
FIG. 7 is a plot of the return optical signal power as measured by the photodiode.
Figure 8:
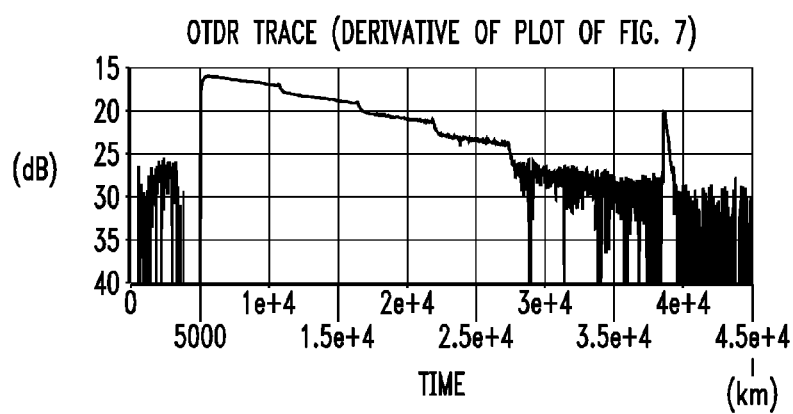
FIG. 8 is a plot created by performing a differentiation on the curve of FIG. 7, taking the form of a conventional OTDR trace.

FIG. 6 is a signal trace showing an exemplary input probing signal that utilizes this "trailing edge" (negative-going edge) signal, with the turning "off" shown as occurring at the beginning of the measurement interval, time $t_1$. FIG. 7 is a plot of the return optical signal power as measured by the photodiode, the plot beginning at the same point in time $t_1$ as when the laser source is turned "off". Each point on the graph after the turn-off is a measure of the integral value of all of the backscattered and reflected light from the current location of this trailing edge to the far-end termination of the fiber span. FIG. 8 is a plot created by performing a differentiation on the curve of FIG. 7. In accordance with the teachings of the present invention, the differential of this returned power curve reveals the classical OTDR trace. For the specific resolution factor used to generate the plot shown in FIG. 8, the OTDR trace clearly reveals the fiber span as having multiple sections, with insertion loss occurring at each interface between sections.

As can be seen by referring to the plots of FIGS. 6-8, the method of performing OTDR measurements in accordance with the present invention is able to create a standard OTDR trace without the need to utilize a complicated, expensive pulsed input source to collect data on a trace-by-trace basis. Rather, the method and system of the present invention relies only the edge propagation of a continuous light signal (leading edge and/or trailing edge) along the length of the fiber span and the sampling of the return signal to collect a series of measurements as a function of time.

Figure 9:
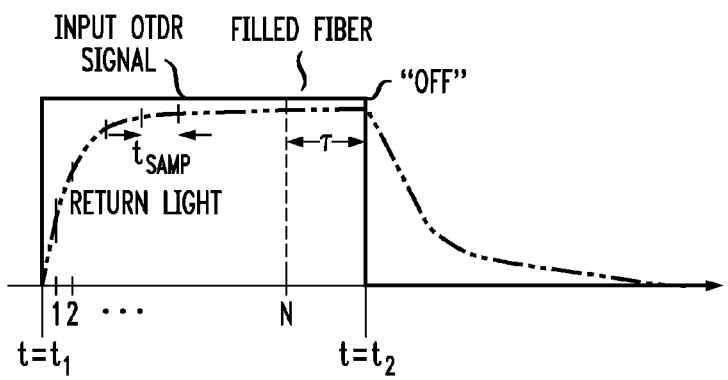
FIG. 9 contains a set of plots associated with a particular embodiment of the present invention that utilizes information collected along both the leading edge and trailing edge of an exemplary square wave laser input probe signal.

FIG. 9 contains a set of plots associated with a particular embodiment of the present invention that utilizes information collected along both the leading edge and trailing edge of an exemplary square wave laser input probe signal. In this case, measurements are performed for an extended period of time, recording the return signal power associated with both "filling" the fiber with light, and then "emptying" the fiber. An exemplary edge-propagating (e.g., square wave) OTDR input signal I is plotted in FIG. 9, with a plot also shown of the return signal R captured by an associated photodiode. The first half of the plot is associated with the leading edge configuration, such as described above in association with FIG. 4, where the input signal I is turned "on" and begins to fill the fiber. Return signal R thus begins with a value of zero, and then continues to increase as the accumulated return power corresponds to more and more of the fiber span being filled with light. It is to be understood that it is possible for input signal I to remain "on" for a period of time after the associated fiber span is filled, where this will not affect the processing performed on the reflected signal. This situation is depicted in FIG. 9, where it is shown that input signal I remains "on" for an extended period of time τ after the fiber is filled. In this case, received signal value R remains essentially constant for this time period, thus the power measured at the sampling times during time period τ will remain essentially constant.

Once input signal I is turned "off" at time $t_2$, the measured value of return signal power R begins to drop off, eventually going to essentially zero. The signal continues to be sampled, with the decreasing power measurements continuing to be stored in analysis unit 22. By combining the use of both leading and trailing edge measurements, it is possible to reduce the overall accumulation time necessary to obtain the necessary data by a factor of 2. Moreover, by sampling both the leading edge and trailing edge return signal values, the relative noise present in the measurements will be significantly reduced, as a result of averaging the two complementary sets of data points. As mentioned above, oversampling and/or multiple scans may also be used to minimize the presence of noise in the results.

Regardless of whether a leading edge configuration, trailing edge configuration, or a configuration using both a leading edge and trailing edge is used, a significant aspect of the present invention is that only a single series of measurements needs to be performed to allow for multiple OTDR traces at various levels of detail to be generated. In some instances, it is desired to study a very detailed version of the trace associated with a specific section of the fiber span. In other circumstances, it may be necessary to accurately locate an event that is positioned deep along the span. Indeed, an increasingly important goal is to be able to accurately measurement relatively long spans exceeding 100 km. Advantageously, all of the these various types of OTDR traces can be provided from post-processing of the single dataset of power sample values collected by the novel system of the present invention.

Figure 10:
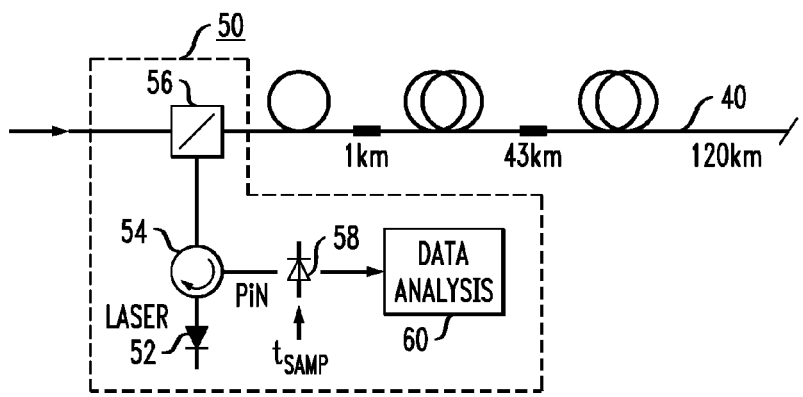
FIG. 10 illustrates an exemplary arrangement utilizing the OTDR measurement system of the present invention to characterize a relatively long fiber span.
Figure 11:
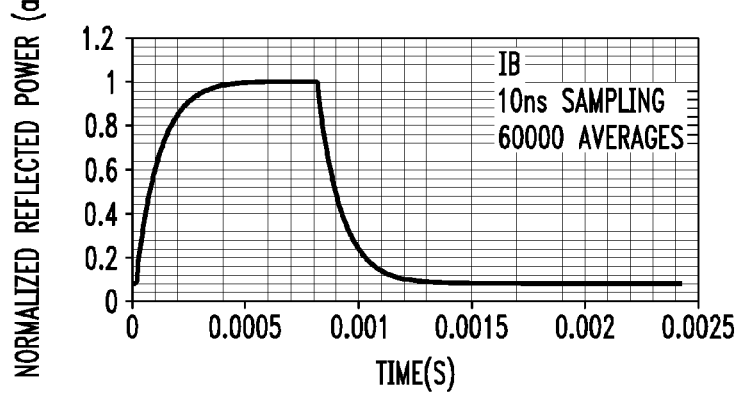
FIG. 11 is a plot of the return power received by photodiode in the arrangement of FIG. 10, measured as a function of time.

FIG. 10 illustrates an exemplary arrangement that is useful in understanding this "single data collection" aspect of the present invention. In this case, an edge-propagating OTDR system 50 formed in accordance with the present invention is used to perform OTDR measurements on a fiber span 40 that has a length of about 120 km. OTDR system 50 is shown as including a laser source 52, where the light generated by laser source 52 passes through a circulator 54 and is directed by an optical multiplexer 56 into fiber span 40. Return (reflected and backscattered) light passes through multiplexer 56 and is re-directed by circulator 54 into a photodiode 58. As before, the received optical power signal is sampled at a predetermined rate, and the samples values stored in data analysis unit 60 for further processing. FIG. 11 is a plot of the return power received by photodiode 58, measured as a function of time.

As discussed above, the input signal I is a continuous optical input and remains "on" for a period of time at least sufficient to ensure that the entire 120 km length of fiber span 40 is illuminated, with the sampled power values ensuring that the entire fiber has been measured. In one particular configuration of the embodiment of FIG. 10, the sampling rate was selected to be 12.5 MHz, creating a dataset of approximately 500,000 samples to be stored as a dataset in a database 62 of data analysis unit 60. Thereafter, light source 52 may be turned "off". As mentioned above, in some embodiments, data may continue to be collected as the trailing edge of input signal I propagates along fiber span 40.

Figure 12:
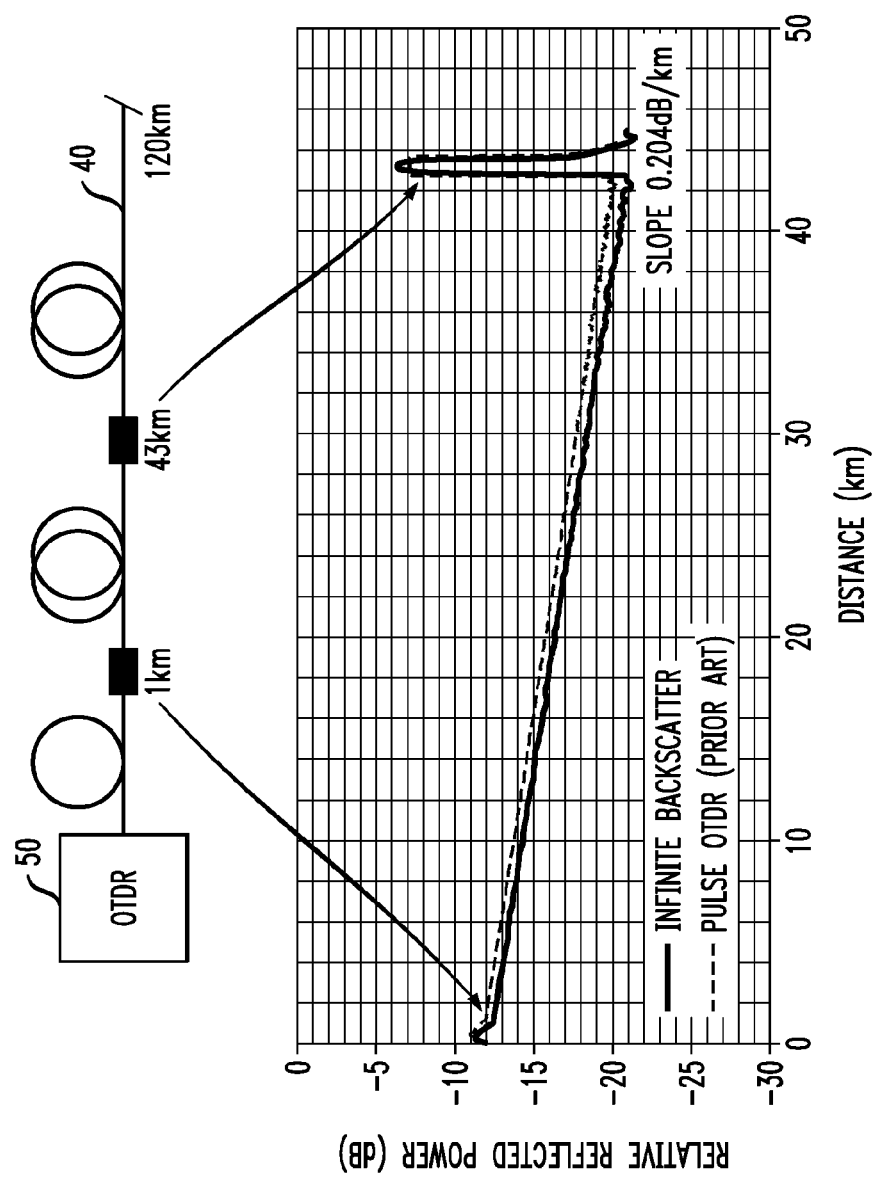
FIG. 12 contains an OTDR trace formed in accordance with the present invention by performing a differentiation function on the data plotted in FIG. 11, and also includes an OTDR trace generated for the same fiber span by a conventional (pulsed) OTDR system, for the sake of comparison.

As described above, an OTDR trace associated with fiber span 40 is obtained by performing a differentiation on the data shown in FIG. 11. FIG. 12 illustrates the result of this differentiation for a selected resolution factor. For the sake of comparison, an OTDR trace generated from a conventional (pulsed) OTDR system is also shown, where for the prior art trace, it was required to use pulses with a pulse width of 10 μs. It is clear that the edge-propagating configuration of the present invention (also referred to at times as an "infinite backscatter" technique) provides essentially the same information as generated using the more complicated pulsed technique.

Figure 13:
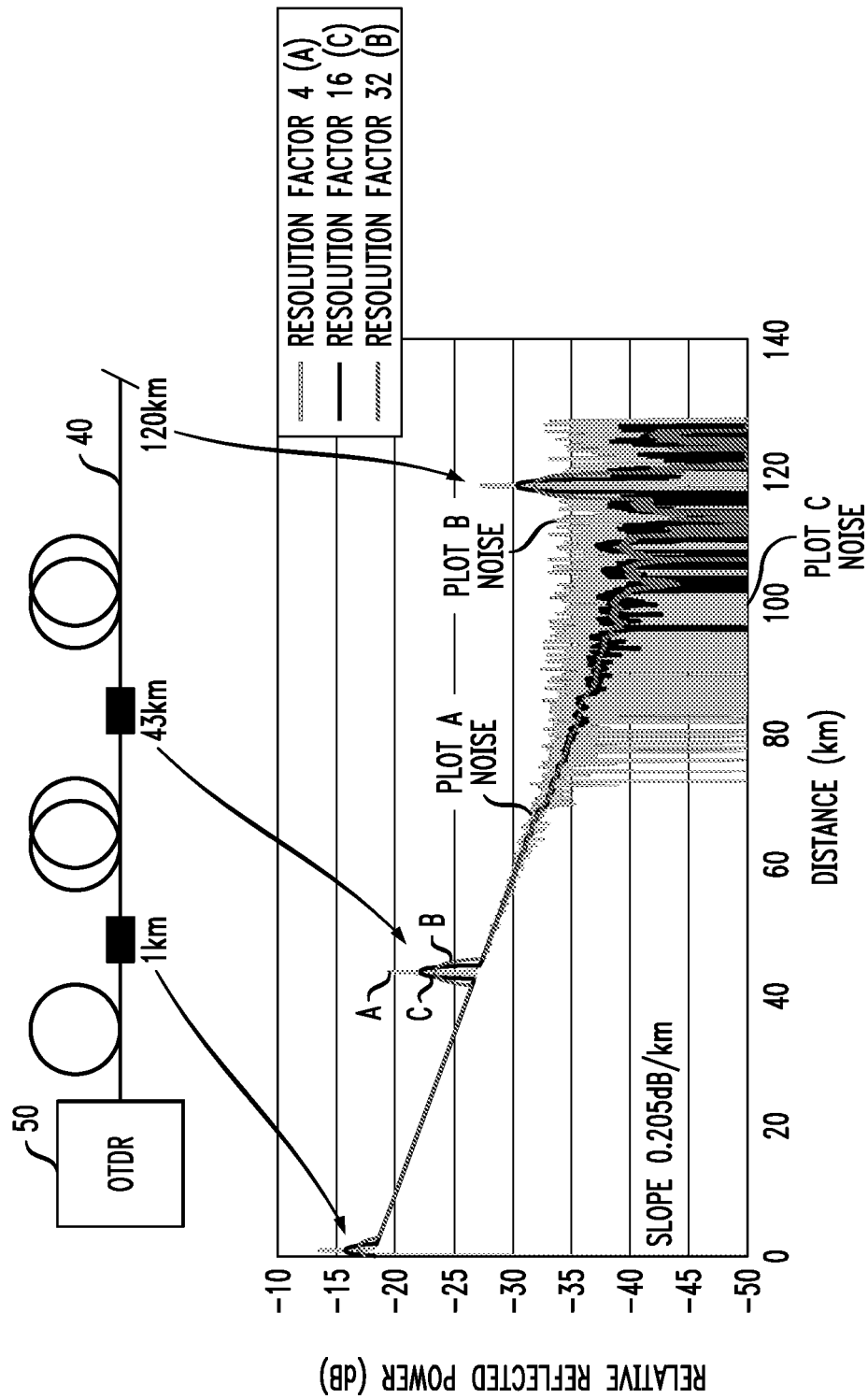
FIG. 13 contains a set of three different OTDR traces created for data shown in the plot of FIG. 11, each profile generated by using a different resolution factor when processing the same dataset.

An advantage of the system of the present invention is that post-processing techniques may be used to ascertain different levels of detail from the single dataset of sampled power measurements. That is, by using different differentiation resolution factors, a variety of different OTDR traces can be generated from the same dataset. FIG. 13 contains a set of three different OTDR traces created for fiber span 40 of FIG. 11, each profile generated by using a different resolution factor when processing the same dataset of 500,000 samples. A first plot (labeled "A") was generated by using a low resolution factor (4), meaning that each differentiation was created over a distance of four samples. In this case, the result is at a relatively fine level of granularity and is useful in accurately locating Fresnel reflection associated features, since these spikes tend to spread out over a long distance when calculating with a higher resolution factor. As shown, however, the trace of plot A becomes overwhelmed by the presence of noise at the outer limits of the fiber span. A second plot (labeled "B") was generated by using a higher resolution factor (i.e., 32), using the same dataset as the input. As clearly shown, the use of a higher resolution factor reduces the level of noise present in the trace, allowing for an accurate determination of event locations deep along fiber span 40.

A third plot (labeled "C") was generated by using yet another resolution factor (in this case, 16), indicating the flexibility of the system of the present invention to create a variety of different OTDR traces from the same input dataset. The ability to generate OTDR plots of different resolution factors in the prior art could only be obtained by performing several different measurement sequences, utilizing a variety of different pulse widths for the probe pulse. In accordance with the present invention, however, all of this information is retrieved during a single measurement process and there is no need to re-scan the fiber time and again to collect different levels of detail in the power measurements.

Inasmuch as all three plots in FIG. 13 were created from the same initial dataset, it is an obvious advantage of the present invention that the data may be processed using a variety of different resolutions so as to capture both "localized" information as well as distance-related information.

Figure 14:
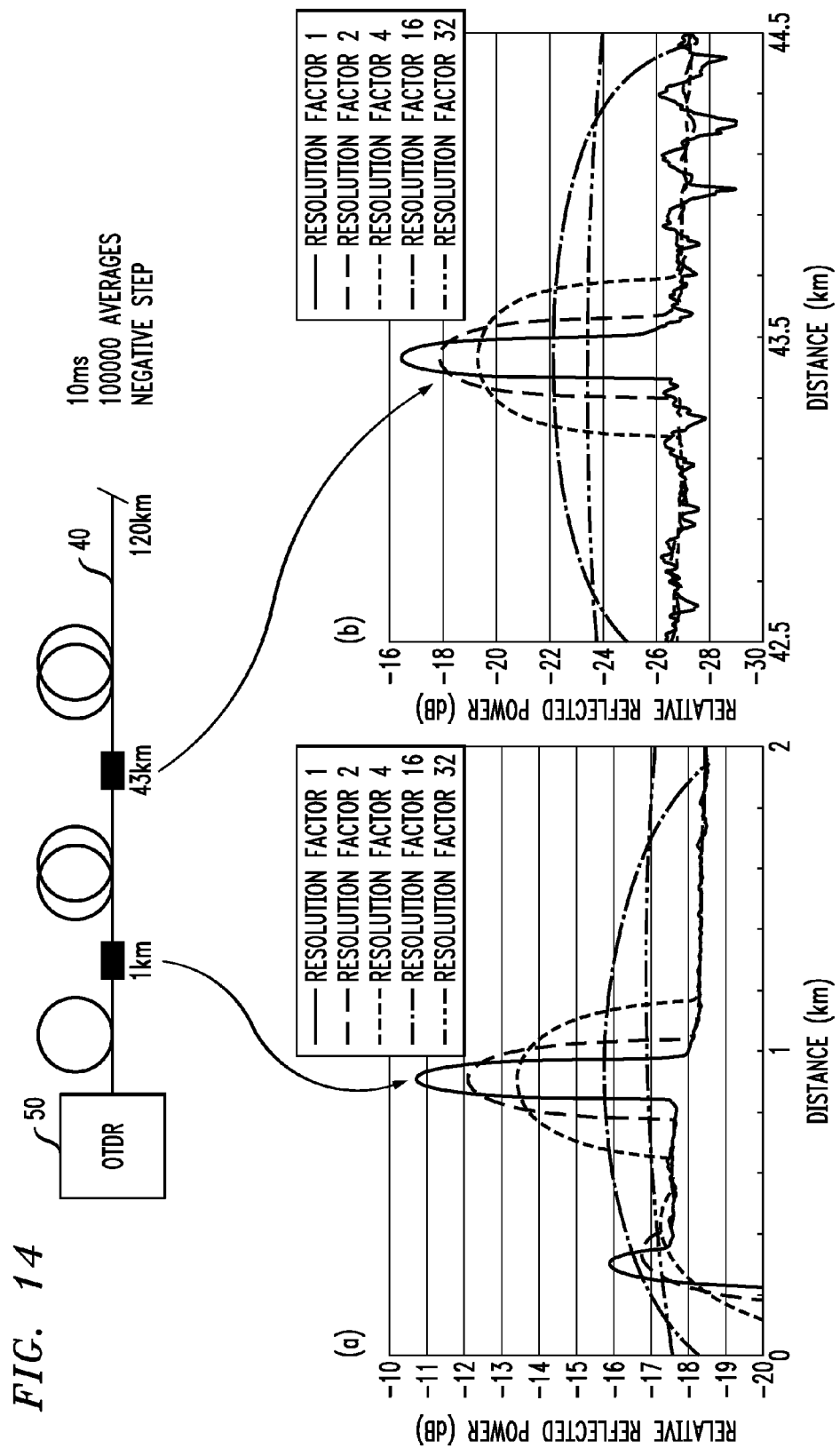
FIG. 14 depicts the distance-invariant feature of the accuracy of the system of the present invention, with FIG. 14(a) including a set of plots (of different resolution factor) associated with the 1 km point along a fiber span and FIG. 14(b) showing traces associated with the 43 km point along the same fiber span.

Moreover, the process of the present invention has been found to be distance-invariant, meaning that the accuracy of a given OTDR trace at a first location along a fiber span is the same as the trace at a different location along the span. FIG. 14 illustrates this aspect of the present invention, with plot (a) showing traces associated with the 1 km point along fiber span 40 and plot (b) showing traces associated with the 43 km point along fiber span 40. Each plot includes a set of five different OTDR traces, all calculated from the same single dataset. As shown, each trace is generated using a different resolution factor, ranging from a factor of "1" to "32". Although noisier at the more distant measurement point along the span (compare the resolution factor 32 traces in plots (a) and (b)), the benefit in higher resolution using the techniques of the present invention can be seen when looking at the collection of data in both plots (a) and (b). In this data, the improvements in distance resolution by reducing the associated resolution factor is clear. It is also clear from the plots of FIG. 14 that along the fiber there is no reduction in distance resolution accuracy for each of the resolution factors; that is, the same resolution is achieved at both 1 km and 43 km.

Figure 15:
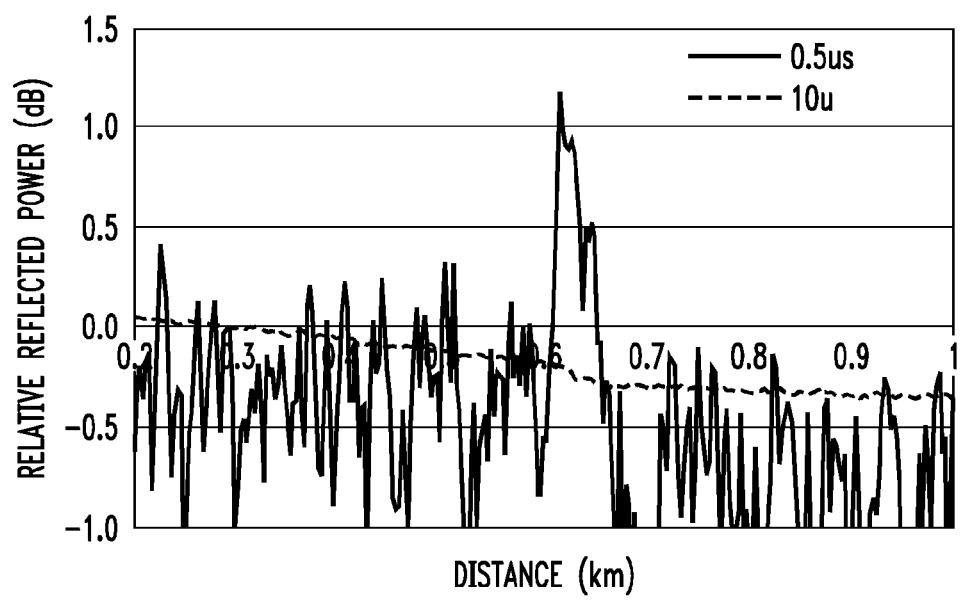
FIG. 15 is a composite analysis example, showing the benefits of utilizing different levels of resolution.
Figure 15:
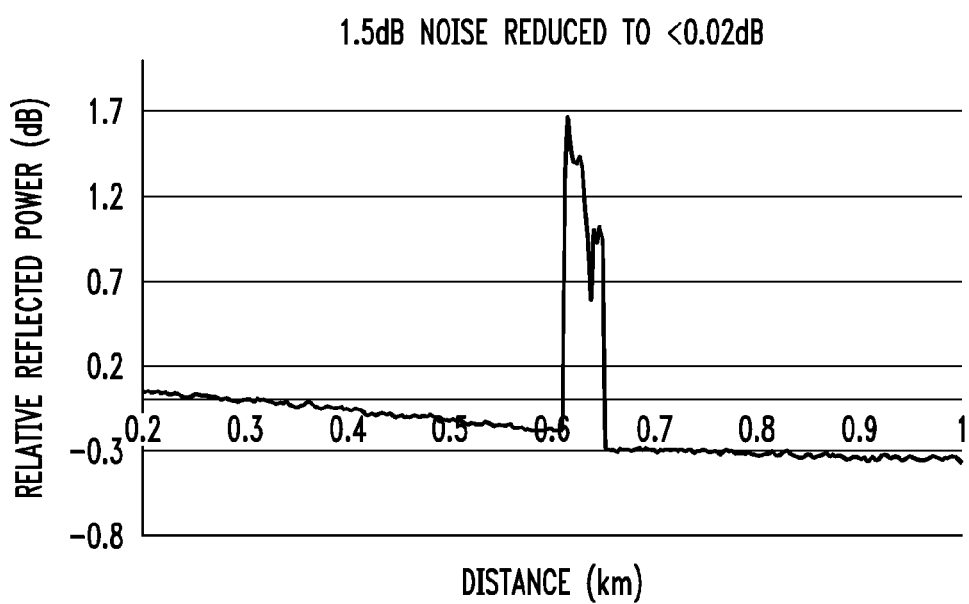

FIG. 15 is a composite analysis example, showing the benefits of utilizing different levels of resolution. The first plot has two set of data with different differentiations. The set of data associated with the small step size (i.e., a small resolution factor), it is clear that a relatively large level of noise remains in the plot, but the "event" is clearly visible. The second data set is associated with a larger step size (higher resolution factor), which reduces the visibility of the noise in the plot. The use of the longer, higher-averaged step allows for the step-down in attenuation at a distance along the span to be clearly seen. By combining the two calculations (based upon the same data set), it is therefore possible to glean both types of data—the event within the noise, as well as the attenuation further along the span.

Figure 16:
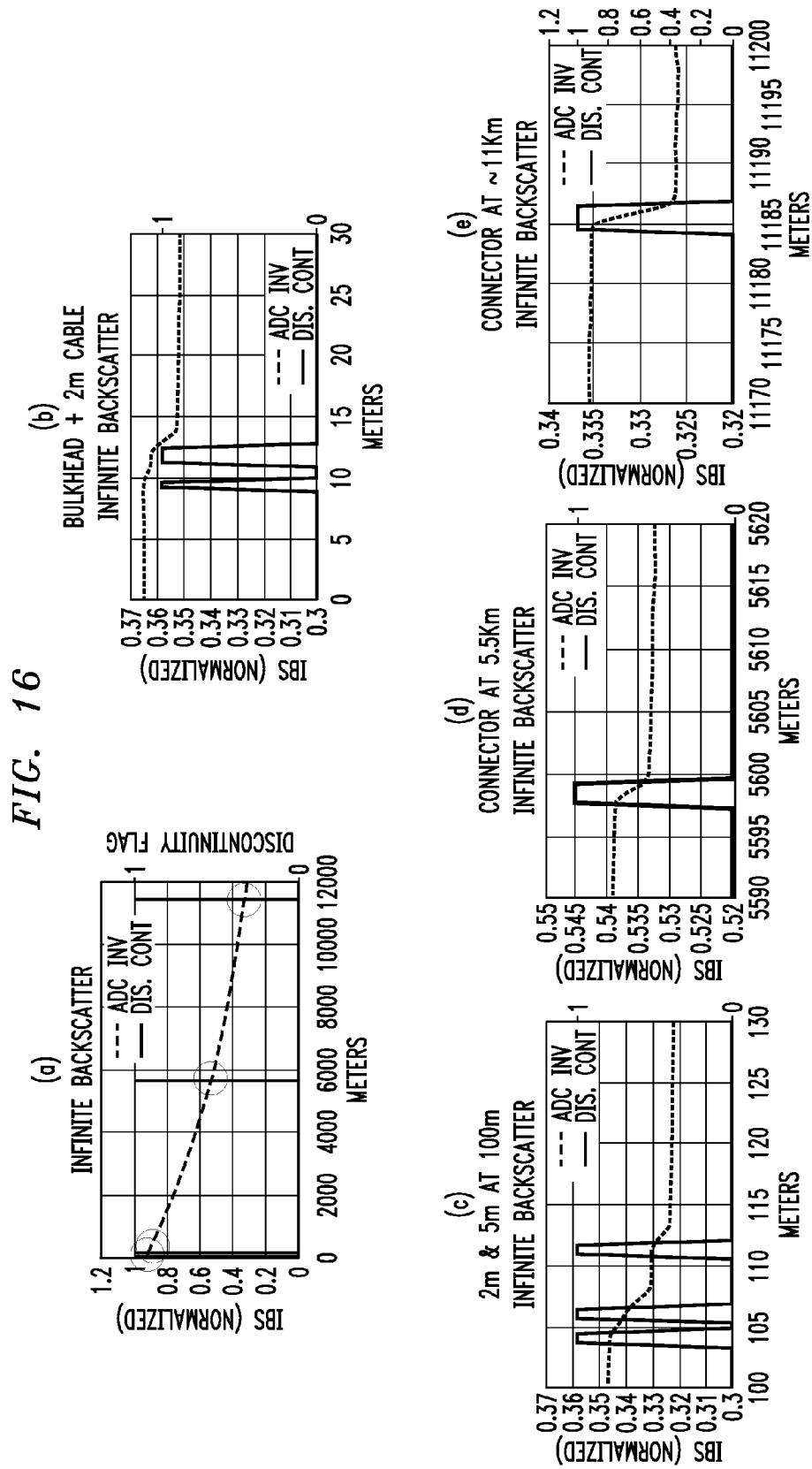
FIG. 16 includes a set of plots illustrating the ability to dynamically modify the details of an OTDR trace, with FIG. 16(a) illustrating a trace exhibiting little detail, and FIGS. 16(b)-16(e) being traces of higher level of detail, created by zooming into specific, identified locations along the trace of FIG. 16(a)

The ability to perform multiple analyses on a single dataset is significant. Indeed, it is relatively straightforward to utilize software-controlled systems to apply a given set of "visualization requirements" to the data, and then generate the desired type of trace for review. FIG. 16 illustrates this point. FIG. 16(a) as an exemplary trace of a complete fiber span as created using the edge-propagation technique of the present invention. In this case, there are four separate discontinuities noticeable in the trace (i.e., the spikes in the plot). When viewing this data, a user can then request the dataset to be re-plotted to "zoom" in on each one these areas, allowing the user to further study and identify the potential problems at each of these locations. FIGS. 16(b)-(e) are plots of the same dataset, in each case after being instructed to zoom in on different sections so that specific events can be identified. FIG. 16(b) showing a detailed plot near the beginning of the fiber span (i.e., to a point 2 km along the fiber), FIG. 16(c) showing a detailed plot at the 100 m mark, FIG. 16(d) at the 5.5 Km point, and FIG. 16(e) containing a detailed view of an event at a point 11.5 km along the fiber span.

Figure 17:
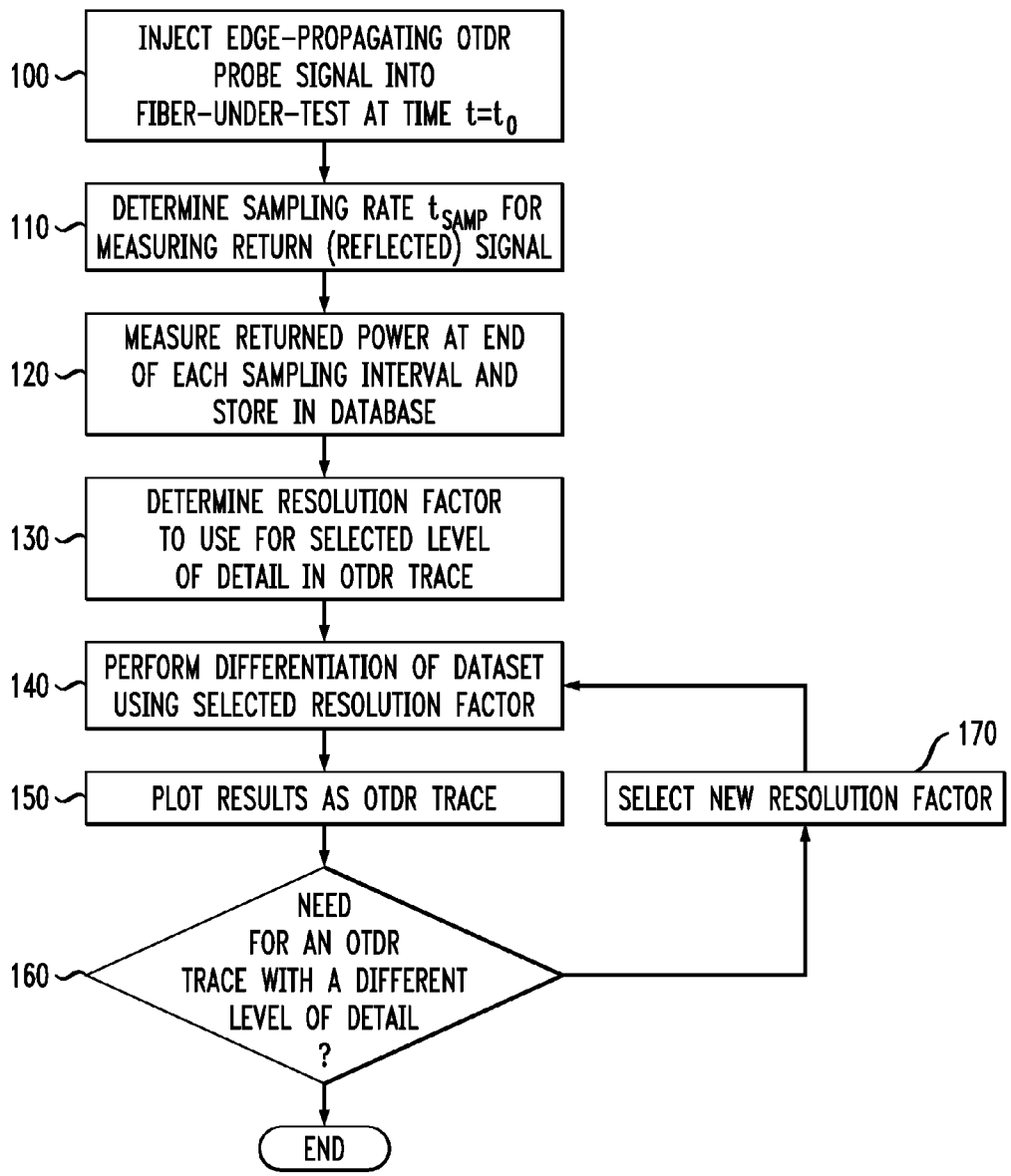
FIG. 17 is a flowchart showing an exemplary set of steps that may be followed to generate OTDR traces in accordance with the novel edge-based OTDR method of the present invention.

FIG. 17 is a flowchart of the steps involved in performing OTDR measurements in accordance with the present invention. As shown, the process begins at step 100 by injecting the edge-propagating laser probe signal into the optical fiber being studied. The sampling rate to be used in capturing the return signal measurements is also determined (shown as step 110). The actual measuring process then begins, with the return optical power being sampled at a photoreceiver and the samples stored in a database (step 120), The samples may be stored for an indeterminate period of time, with the actual generation of the OTDR trace(s) being initiated by personnel at any point in time after all of the samples have been collected.

To begin the actual process of generating an OTDR trace, a resolution factor is first selected (step 130), where the selected resolution factor will determine the level of detail shown in the OTDR trace. A differentiation operation is then performed on the stored dataset of power measurement samples, using the selected resolution factor, as indicated by step 140. A plot (or other illustration of the results) is then presented as the OTDR measurement information in step 150. A decision is then made at step 160 regarding the need for another OTDR trace to be generated, exhibiting a different level of detail in the presented information. If there is no need for another OTDR trace, then the process is completed. Alternatively, if it is desired to generate another OTDR trace with a different level of detail, another resolution factor is selected (step 170) and the process returns to step 140 to perform another differentiation, this time with the new resolution factor.

Summarizing, by illuminating a complete fiber span in accordance with the present invention, instead of transmitting a series of narrow pulses along the fiber, the distance resolution abilities of the OTDR measurement is a characteristic only of the selected sampling rate and the post processing capabilities of the system. In the prior art, this distance resolution was limited by the pulse scheme used as the probe source. As a result of the teachings of the present invention, it is possible to produce an invariant distance resolution plot along the entire extent of the optical fiber span. The ability to more accurately locate faults deep into a fiber is a significant improvement over the prior art pulsed OTDR system, where a larger pulse length is required to measure longer distances into the fiber with a consequential impact on distance resolution.

Advantageously, the use of a continuous source laser for the probe signal allows for a simplified design over prior art configurations that required the use of a pulse generator. Indeed, it is possible to utilize a laser source designed for a specific use (i.e., Raman amplification) to also be used for the OTDR laser source. The simplified OTDR source configuration allows for OTDR systems to be embedded at various points within the optical network.

In comparison to prior art receivers used in pulsed OTDR systems, the photodiode device utilized in the inventive edge-propagating OTDR system does not need to be highly sensitive to extremely low power reflections, since an accumulated signal over a longer period of time is being measured. The use of a more conventional photodiode thus significantly reduces the well-known event dead zone and attenuation dead zone problems associated with prior art OTDR systems, where it was necessary to allow for the photodiode to be flushed and all photons eliminated before starting a second measurement.

Figure 18:
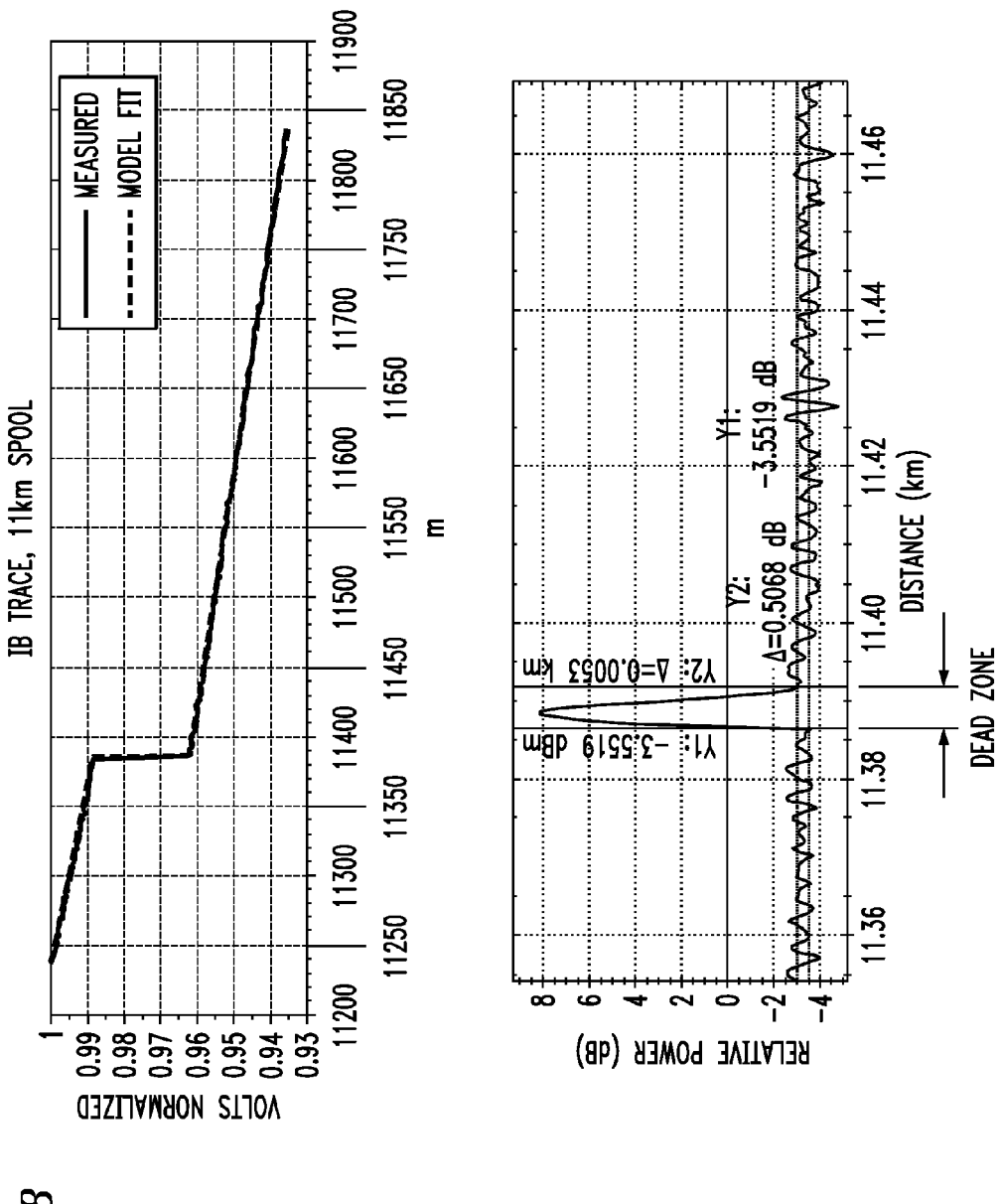
FIG. 18 illustrates the improvement in attenuation dead zone when using the edge-propagating OTDR measurement system of the present invention.
Figure 18:
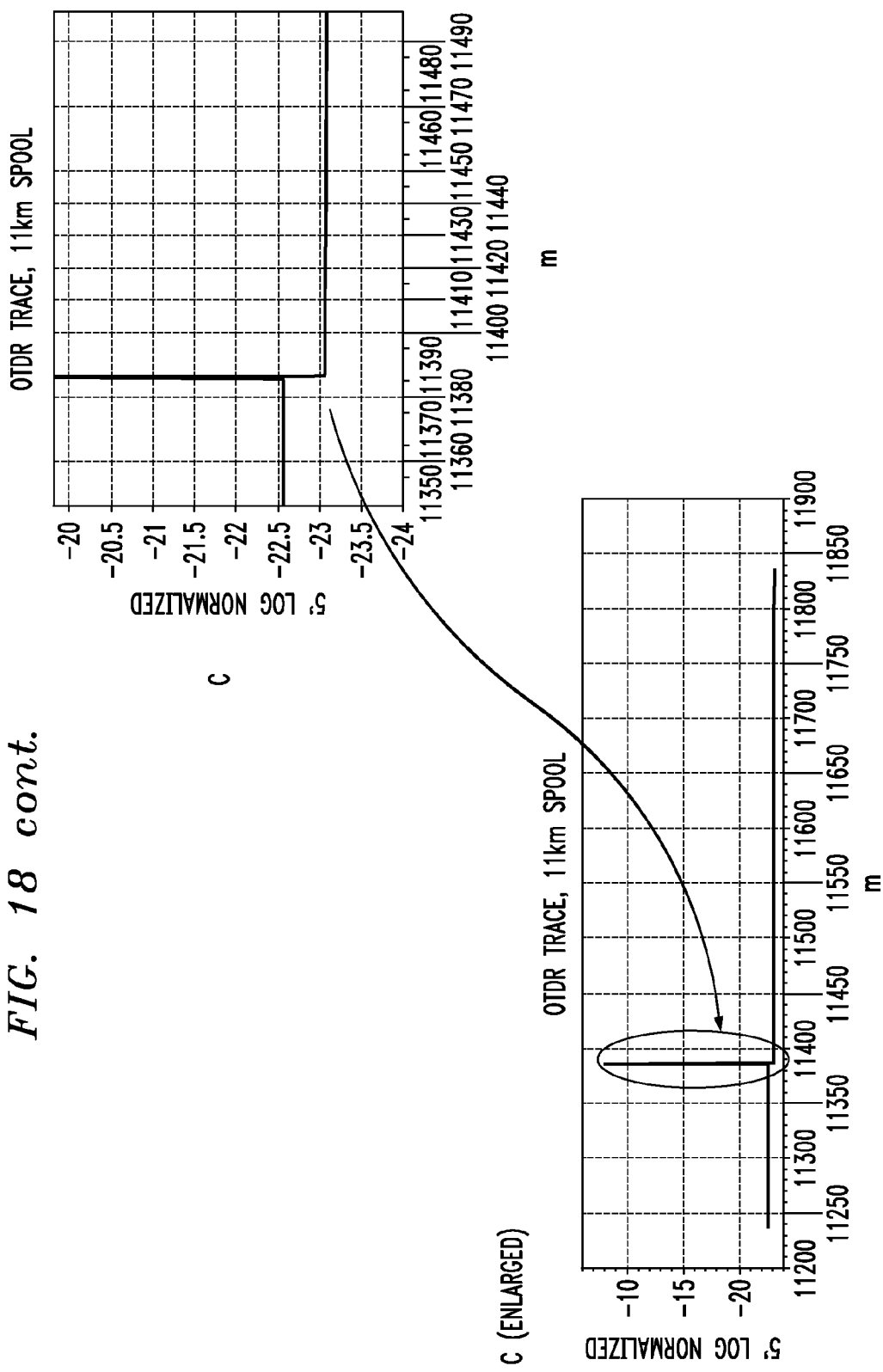

FIG. 18 illustrates this reduction in dead zone problems associated with the edge-propagating OTDR system of the present invention (in this case, associated with the event as found at the 11 km point along the fiber span as discussed above in associated with FIG. 16(e)). Plot A in FIG. 18 includes both the "raw" data collected by an optical detector in the inventive OTDR system and hypothetical data associated with a prior art configuration using a pulse source. Plot B, associated with the prior art configuration, shows an attenuation dead zone of about 5.3 meters at a distance of 11 km along a fiber span. Using the edge-propagating system of the present invention, this attenuation dead zone was reduced to a value of about 0.8 meter, as shown in Plot C of FIG. 18.

It will be appreciated that the above descriptions are intended to serve only as examples, and that many other embodiments are possible within the scope of the present invention as defined by the appended claims.

What is claimed is:

1. A method of performing OTDR measurements along a fiber span, the method including the steps of:
 a) initializing a fiber span;
 b) injecting an optical signal into an input port of an optical fiber span, the optical signal defined as exhibiting a propagating transition edge;
 c) measuring return, reflected optical power received at the input port from the propagating transition edge, wherein the measuring is performed at a predetermined sampling rate for an extended period of time until the propagating transition edge reaches a far-end termination of the fiber span, creating a plurality of measured power samples;
 d) storing the plurality of measured power samples in a database;
 e) determining an appropriate resolution factor for creating an OTDR trace exhibiting a desired level of detail;
 f) performing a difference calculation on the plurality of measured power samples, using the appropriate resolution factor as the space between the difference calculation endpoints; and
 g) providing the results of the difference calculation performed in step f) as OTDR measurement data.

2. The method as defined in claim 1, wherein in performing step b), a leading edge of the input signal is used as the propagating transition edge to initiate the measuring process of step c).

3. The method as defined in claim 1, wherein in performing step b), a trailing edge of the input signal is used as the propagating transition edge to initiate the measuring process of step c).

4. The method as defined in claim 1, wherein in performing step e), the resolution factor is determined as a function of the level of detail to be presented in the OTDR data, with a low resolution factor creating OTDR data with a high level of detail, and a high resolution factor creating OTDR data indicating events deep within the optical fiber span.

5. The method as defined in claim 1, wherein a plurality of different OTDR traces are created from the plurality of measured power samples by repeating steps e)-g) and selecting a different resolution factor for each repetition.

6. The method as defined in claim 1, wherein in performing step g), the OTDR data is displayed as an OTDR trace.

7. The method as defined in claim 1, wherein in performing step g), the OTDR data is displayed in an OTDR event table.

8. The method as defined in claim 1, wherein in performing step g), the OTDR data is displayed as about an OTDR trace and an OTDR event table.

9. The method as defined in claim 1, wherein in performing step b), a low power optical signal is injected into the fiber span, providing an OTDR measurement attenuation dead zone of less than 1 m.

* * * * *